United States Patent Office 2,981,721
Patented Apr. 25, 1961

2,981,721
METHOD OF ELASTICIZING PLASTIC CARBOXYL-CONTAINING SYNTHETIC RUBBERY POLYMERIC MATERIALS AND ELASTIC PRODUCTS PRODUCED THEREBY

Harold P. Brown, Akron, Ohio, assignor to The B. F. Goodrich Company, New York, N.Y., a corporation of New York No Drawing. Filed Oct. 1, 1956, Ser. No. 612,942

7 Claims. (Cl. 260—80.7)

The present invention relates generally to synthetic rubbery compositions and a method of making same and in particular to a method of producing elastic synthetic rubbery compositions having a new and novel combination of properties among which are superior tensile strength, modulus, elongation, retention of tensile strength under tension and/or compression (stress-decay), and improved resistance to compression set combined with good low temperature flexibility and resistance to ozone.

In my copending application Serial No. 197,495, filed November 24, 1950, now Patent No. 2,669,550, I have disclosed that elastic synthetic rubbery materials of novel properties and great utility are produced by adding a polyvalent metallic oxide and a carboxylic acid "controller" to a plastic, carboxyl-containing rubbery polymer and then heating or "curing" at temperatures of 125 to 400° F. so as to bring about the reaction of the metallic oxide with the combined carboxyl (—COOH) groups of the rubbery polymer. It is pointed out therein that the strongly elastic rubbery products are polymeric metallo-carboxylates formed by a polymer condensation or salt formation between the metallic cation of the metal oxide and the combined carboxyl (—COOH) groups of the rubbery material.

It has been noted, however, that some polymeric metallo-carboxylates in spite of their extremely high tensile strengths and other novel properties have several defects which somewhat limit their application as general purpose rubbery materials. They often have extremely high compression set values and under prolonged tension or compression may suffer a loss of strength. While the polymeric metallo-carboxylates are extremely flexible at both low and high temperatures they do not always exhibit a flex-life comparable to rubbery sulfur vulcanizates. Moreover, in formulations containing reinforcing pigments such as carbon black they are not always reinforced in the same manner as are sulfur vulcanizates of natural and synthetic rubbery materials.

I now provide, by this invention, elastic synthetic rubbery compositions having a novel and unique combination of properties including extremely high tensile strengths both with or without reinforcement, good low temperature flexibility, improved flex-life, unusually good resistance to ozone, water, sun-light and other powerful deleterious influences, and in addition are possessed of compression set values, stress-decay properties and response to reinforcing pigments approaching or equaling the best natural and synthetic rubber sulfur vulcanizates. The compositions are unlike conventional synthetic rubber vulcanizates in that they are broadly polymeric amides being either "polymeric amido-carboxylates" or "polymeric imido-carboxylates," depending on reaction conditions, produced by a polymeric condensation reaction or condensation polymerization involving (1) the combined carboxyl groups of a plastic synthetic rubbery polymeric material comprising predominantly linear carbon chains to which are attached a controlled amount of combined carboxyl (—COOH), as hereinafter defined, and (2) a polyamine salt of a weak acid, as hereinafter defined.

The production of these elastic synthetic rubbery compositions, in accordance with this invention, is effected by a multi-step process as follows:

(A) Preparing a plastic, synthetic rubbery polymeric material containing a controlled amount and distribution of combined carboxyl (—COOH) groups, (B) Admixing the plastic workable polymer with a polyamine salt containing at least two amino- or imino-nitrogen groups, and (C) Heating the resulting plastic composition until a condensation reaction has occurred and the plastic composition has been converted from an essentially plastic condition to an essentially strong, elastic, non-plastic condition (hereinafter referred to as a "polymeric amido-carboxylate") having properties comparable to metallo-carboxylates or, alternatively, (D) Heating either the plastic composition of step (B) or the essentially elastic composition of step (C) under more drastic conditions until the amido-type salt linkages are converted to diamide or imido-type of primary cross-linkages and the material has been converted to a strongly-elastic "polymeric imido-carboxylate" having greatly improved stress decay properties, greatly improved compression set values, and other evidences of a tightly-cured condition.

Step (A) in the process may be carried out in various ways differing considerably one from the other but all designed to produce a plastic, workable synthetic polymer comprising predominantly linear carbon chains to which are attached a plurality of free carboxyl (—COOH) groups. One class of rubbery materials of this nature is the plastic polymers of an open-chain aliphatic conjugated diene containing a controlled amount of combined carboxyl (—COOH) groups. These rubbery materials may be made in many different ways as disclosed in my copending applications Serial Nos. 193,521, now Patent No. 2,724,707; 193,522, now Patent No. 2,662,874; and 193,523, now Patent No. 2,710,292; all filed November 1, 1950.

For example, as disclosed in Pat. No. 2,724,707, they may be made by the interpolymerization in an acidic aqueous medium of a monomeric mixture comprising predominantly (i.e. at least 50% by weight) an open-chain aliphatic conjugated diene and an equal or lesser proportion of an olefinically-unsaturated carboxylic acid.

The open-chain, aliphatic conjugated diene may be any of the butadiene-1,3 hydrocarbons such as butadiene-1,3 itself, 2-methyl butadiene-1,3 (isoprene), 2,3-dimethyl butadiene-1,3, piperylene, 2-neopentyl butadiene-1,3, and other hydrocarbon homologs of butadiene-1,3; or it may be any of the substituted open-chain, aliphatic conjugated dienes such as 2-chlorobutadiene-1,3, 2-cyanobutadiene-1,3; or it may be any of the straight chain conjugated pentadienes or the straight- and branch-chain hexadienes and others. The butadiene-1,3 hydrocarbons and butadiene-1,3 in particular, because of ability to produce stronger and more desirable polymers are much preferred.

The olefinically-unsaturated carboxylic acids which are polymerized with such a diene in the production of carboxyl-containing rubbery polymers are characterized by possessing one or more olefinic carbon-to-carbon double bonds and one or more carboxyl (—COOH) groups, that is, monocarboxy and polycarboxy, monoolefinic and polyolefinic acids including, for example, such widely divergent materials as acrylic acid, the alpha-alkyl acrylic acids, crotonic acid, beta-acryloxy propionic acid, beta-allyloxy propionic acid, beta-methallyloxy propionic acid, alpha- and beta-vinyl acrylic acids, alpha-beta-isopropylidene propionic acid, sorbic acid, cinnamic acid, maleic acid, oleic acid, undecylenic acid, ricinoleic acid, linoleic acid, linolenic acid and others.

It is preferred to use, as the olefinically-unsaturated acid polymerized with the diene, one or more olefinically-unsaturated carboxylic acids containing at least one activated olefinic carbon-to-carbon double bond, that is, an acid containing an olefinic double bond which readily functions in an addition polymerization reaction because of its presence in the alpha-beta position with respect to a carboxyl group thusly —CH=CH—COOH, or its being attached to a terminal methylene grouping thusly $CH_2$=C<. In the alpha-beta unsaturated carboxylic acids the close proximity of the strongly polar carboxyl group to the double-bonded carbon atoms is believed to have a strong activating influence rendering these acids very readily polymerizable. Likewise, when an olefinic double bond is present attached to a terminal methylene group, it is believed that the methylenic hydrogen atoms are responsible for making the double-bonded carbon atoms readily enter into polymerization reactions.

Illustrative alpha-beta unsaturated carboxylic acids within the just-described preferred class include maleic acid, fumaric acid, crotonic acid, angelic acid, hydrosorbic acid, cinnamic acid, m-chlorocinnamic acid, p-chlorocinnamic acid, alpha-cyano cinnamic acid, umbellic acid, and other monoolefinic monocarboxylic acids; sorbic acid, alpha-methyl sorbic acid, alpha-ethyl sorbic acid, alpha-chloro sorbic acid, alpha-methyl-gamma benzal crotonic acid, beta-(2-butenyl) acrylic acid (2,4-heptadiene-oic-1), 2,4-pentadienoic acid, 2,4,6-octatrienoic acid, 1-carboxy-1-ethyl-4-phenyl butadiene-1,3, 2,6-dimethyl decatriene-(2,6,8)-oic-10, alpha-beta-isopropylidene propionic acid having the structure:

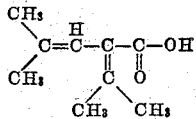

alpha-vinyl cinnamic acid, alpha-isopropenyl-furfural acetic acid, alpha-isopropenyl-cinnamenyl acrylic acid, and other polyolefinic monocarboxylic acids; hydromuconic acid, glutaconic acid, maleic acid, fumaric acid, and other monoolefinic polycarboxylic acids; 3-carboxy-pentadiene-(2,4)-oic-1, muconic acid, and other polyolefinic polycarboxylic acids.

Olefinically unsaturated carboxylic acids containing the $CH_2$=C< grouping include acrylic acid, alpha-chloro acrylic acid, methacrylic acid, ethacrylic acid, alpha-isopropylidene acrylic acid, alpha-styryl acrylic acid (2-carboxy-4-phenyl butadiene-1,3), beta-vinyl acrylic acid (1-carboxy butadiene-1,3), alpha-vinyl acrylic acid, beta-acryloxy propionic acid, and others.

Best results are obtained by interpolymerizing a monomer mixture containing a major proportion of a diene and a minor proportion of monoolefinic monocarboxylic acid having its olefinic double bond in alpha-beta position with respect to the carboxyl group and also containing a terminal methylene group, such as the acrylic acids including acrylic acid, methacrylic acid, ethacrylic acid, and other acids of this structure listed above.

As mentioned above, the production in step (A) of the plastic synthetic rubbery carboxyl-containing polymer of an open-chain aliphatic conjugated diene may also be carried out as disclosed in Pat. No. 2,662,874. The latter application discloses materials which are the product of the reaction of a carboxylating agent or carboxyl-supplying reagent such as maleic acid or anhydride, acrylic acid, or a mercapto-substituted carboxylic acid such as thioglycollic acid, beta-mercapto propionic acid or an anhydride thereof, or a material such as an alkali metal or alkaline earth mono-salt of a dicarboxylic acid such as monosodium oxalate, monosodium succinate, and others with a plastic polymer of an open-chain aliphatic conjugated diene (preferably a polymer of a butadiene-1,3 hydrocarbon) not containing carboxyl groups, preferably but not necessarily in the presence of a peroxygen catalyst. The result of such a reaction is the introduction of carboxyl groups into the diene polymer molecule.

Another method of producing in step (A) the plastic rubbery carboxyl-containing diene polymeric materials is disclosed in Pat. No. 2,710,292. The materials disclosed in the latter application are produced by the reaction with a hydrolyzing agent of a plastic rubbery interpolymer of an open-chain aliphatic conjugated diene (preferably a butadiene-1,3 hydrocarbon) and an olefinically-unsaturated copolymerizable compound containing groups hydrolyzable to a carboxyl (—COOH) group, such as an unsaturated nitrile (acrylonitrile, for example), ester (an alkyl acrylate or alkacrylate, for example) or amide (acrylamide, for example). The result of the hydrolysis reaction is a plastic rubbery material containing carboxyl groups.

Still another manner of proceeding in step (A) is to produce carboxyl-containing plastic rubbery materials, distinct from the above-described carboxyl-containing diene polymers but which nevertheless are easily converted to strongly-elastic, highly useful polymeric amido- or imido-carboxylates according to this invention, by the introduction of combined carboxyl groups to a plastic rubbery polymer of an alkyl ester of an acrylic acid. Such materials comprise predominantly linear polymer chains and may be produced, for example, as disclosed in the copending application of Earl J. Carlson, Serial No. 197,524, filed November 24, 1950, now Patent No. 2,726,230, by copolymerization in an acidic medium of an alkyl ester of an acrylic acid with an olefinically-unsaturated carboxylic acid of the types described above, or they may be produced, as disclosed in my copending application Serial No. 197,496, filed November 24, 1950, now Patent No. 2,649,439, by the partial hydrolysis of a plastic polymer of an alkyl ester of acrylic acid.

Yet another class of plastic rubbery synthetic polymeric materials comprising predominantly linear carbon chains to which are attached carboxyl groups, also utilizable in this invention, are the result of proceeding in step (A) to produce the rubbery interpolymers of a predominant amount of an isoolefin such as isobutylene with a subordinate amount of a polymerizable acid chloride such as acrylyl chloride, which interpolymers are hydrolyzed to convert the combined acid chloride groupings to carboxyl (—COOH) groups. The preparation of such hydrolyzable materials by reaction in the presence of a Friedel-Crafts type of catalyst is more fully described in my copending application Serial No. 197,497, filed November 24, 1950, now Patent No. 2,671,074.

Any other plastic rubbery polymeric material comprising predominantly linear carbon chains to which are attached carboxyl groups, regardless of whether the carboxyl groups are produced by interpolymerization reactions involving a polymerizable carboxylic acid, by hydrolysis of other groups or by reaction of a rubbery material with a carboxylating agent, or by any other method, may be utilized in the elasticizing reaction of this invention as carried out with a polyamine salt. It is highly important, however, that the plastic, synthetic rubbery material, regardless of how produced, should contain from 0.001 to 0.30 chemical equivalents of combined or polymer bound free carboxyl (—COOH) groups per 100 parts by weight of rubbery material. The carboxyl-content of the rubber is easily determined, for example, by titration of a polymer solution with alcoholic KOH to a phenolphthalein end-point or by complete chemical analysis of the rubber. The plastic, synthetic rubbery materials of the types herein disclosed containing 0.001 to 0.30 chemical equivalents by weight of (—COOH) per 100 parts by weight of rubbery material (hereinafter referred to as "equivalents per hundred rubber" and abbreviated e.p.h.r.) are predominantly plastic in nature and when elasticized according to the method of this invention produce highly useful elastic rubbery compositions. It is not possible, ordinarily, to obtain a significant degree of elasticization of rubbery materials containing less than 0.001 e.p.h.r. of (—COOH). Plastic synthetic rubbery materials containing from 0.01 to 0.15 e.p.h.r. of carboxyl are preferred for the production according to this invention of elastic polymeric amido- and imido-carboxylates having a good balance of tensile strength, modulus, elongation and hardness while rubbery materials containing from 0.01 to 0.10 e.p.h.r. of carboxyl are preferred for the production of elastic compositions having in addition good low temperature flexibility.

Step (B) in the process of this invention is performed by admixing the plastic, rubbery, synthetic carboxyl-containing material of step (A) with a polyamine salt in any conventional manner such as by mill-mixing, by mixing in a Banbury-type or other internal mixer or by mixing a solution or an aqueous dispersion of the rubbery material with a solution or dispersion of the polyamine and depositing or coprecipitating the resultant mixture and the like. The intermixture of the solid rubbery material with the polyamine curing agent should be performed at moderate working temperatures. The mastication of the mixture should be continued until the resulting mixture is homogeneous with the polyamine curative well dispersed in the rubber. Softeners, plasticizers, milling aids, etc. may be utilized to facilitate the mixing step and are preferably incorporated before addition of the polyamine curative. In any case, the resulting intermixture should be plastic and workable.

The curing agents or elasticizing agents which are utilized in step (B) are salts of aliphatic or heterocyclic nitrogen compounds characterized by possessing at least two amino- or imino-nitrogen groups or groups convertible to amino- or imino-nitrogen groups under the conditions of step (B). Thus they are salts of polyamines having the general structure

or

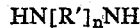

wherein R and R' are any mono- or divalent connecting aliphatic or heterocyclic organic grouping substantially free of other functional groups other than nitrogenous groups. For example, illustrative polyamines, the salts of which are useful in this invention include the alkyl diamines such as dimethylene diamine (ethylene diamine) trimethylene diamine (propylene diamine), 1,3-diaminobutane, pentamethylene diamine, hexamethylene diamine (1,6-diaminohexane), 3-methoxy-1,6-diaminohexane, 3-(2-ethoxyethoxy)-1,6-diaminohexane, 1,3,6-hexane triamine, 3-(1-piperidyl)-1,6-diaminohexane, heptamethylene diamine, decamethylene diamine, 1,8-diamino methane and others; the polyethylene polyamines of the structure $H_2N-(CH_2-CH_2-NH)_n-H$ wherein $n$ is an integer from 2 to 20 or more such as diethylene triamine, triethylene tetramine, tetraethylene pentamine, pentaethylene hexamine, and others; such other polyamines such as dipropylene triamine and others; the heterocyclic polyamines such as piperazine (diethylene diamine), 2,5-dimethyl piperazine, 2-amino pyrrole, 2,6-diamino pyridine, 2,4-diamino-5-(aminoethyl) pyrimidine, 1,4-diamino acridine, 2,5-diamino-1,3,4-thiadiazole, and others. The salts of these and other polyamines with weak organic and inorganic acids such as hexamethylene diamine carbonate, hexamethylene diamine borate, propylene diamine monostearate, tetraethylene pentamine carbonate, and others are useful in the practice of the invention.

It is greatly preferred to utilize the salts of polymethylene (or alkyl) diamines containing from 2 to 10 carbon atoms and the salts of polyethylene polyamines containing from 2 to 5 ethylene groups since these compounds produce the strongest and most highly elastic polymeric amido- and imido-carboxylates. Of these, most preferred are hexamethylene diamine carbonate, acetate, borate, and similar salts of these and other similar amines because of their greater ease of incorporation into the rubbery materials, lack of scorch in the defined elastomer compositions and better physical properties of the vulcanizates.

The polyamine salts of this invention are derivatives of the defined polyamines with weak acids, both organic and inorganic, which are defined for the purposes of this invention as those acids which have a dissociation constant for the first hydrogen at 25° C. of about $1 \times 10^{-5}$ to about $1 \times 10^{-11}$. Such acids include acetic, boric, butyric, carbonic, valeric, acrylic, stearic, and the like. It is known and understood by those skilled in the art that certain acids which fall within the above definition do not form salts with primary amines but form other reaction products. For example, nitrous acid. It is obvious from the disclosure that only the polyamine salts of acids of the defined class regardless of how prepared are intended to be employed. Other useful acids of this class and other polyamine salts may be readily ascertained by reference to standard handbooks and encyclopedias.

The amount of the polyamine salt required for efficient cure will vary, of course, depending on the base polyamine salt itself, on the combined carboxyl (—COOH) content of the polymer and on the fineness and compatibility of the polyamine salt with the rubbery material. Amounts of a polyamine salt sufficient to react with at least 1/10 and preferably 1/2 the carboxyl groups of the polymer should be utilized in order to produce strongly elastic polymeric amido-carboxylates or polymeric imido-carboxylates. For optimum results, the amount of polyamine salt should be about equivalent chemically to the (—COOH) content of the polymer (1/2 mole of a diamine salt required for every mole of carboxyl). Since polyamine salts in large excess appear to have little beneficial effect on the cured compositions it is preferred to utilize not more than twice stoichiometrical proportions. Generally, however, amounts of a polyamine salt such as hexamethylene diamine carbonate varying from 1 to 30% by weight based on the weight of polymer will be found sufficient with amounts from 4 to 20% being preferred.

Although aliphatic polyamines have been proposed as curing agents for carboxyl-containing elastomers the use of such materials in production compounding techniques is far from satisfactory. Such amines are difficult to incorporate into the elastomers and are quite sensitive to air and moisture so that the resulting compounded compositions must be protected from exposure to air and moisture. More important, aliphatic diamines such as hexamethylene diamine cause scorch when mixed with carboxyl-containing elastomers on a mill, evidenced by the mixture becoming dry, nervy, resistant to milling and may even tend to crumble. In many cases where the elastomers contain about 1/10 or more e.p.h.r. of carboxyl it is impossible to mix hexamethylene diamine into the elastomer on a mill because of an immediate cure reaction and subsequent stiffening of the stock. Quite unexpectedly it has been found that polyamine salts defined above may be easily and readily incorporated into carboxyl-containing elastomers on a mill without a scorch problem. Further, the most useful polyamines such as hexamethylene diamine are liquid and absorb moisture so rapidly that they are difficult to handle. The polyamines volatilize readily with possible toxic effects and have an unpleasant odor. The polyamine salts on the other hand are non-volatile and have little odor.

The polymeric condensation or "elasto-condensation" occurring in step (C) of the process of this invention is a reaction which occurs with relatively greater ease than, for example, the reaction involved in sulfur vulcanization of unsaturated diene-type polymers. It is generally desirable to heat the plastic polyamine-containing composition to cause the rubbery polymer to coalesce and flow, to insure efficient distribution or solubilization of the amine salt through the composition, and to reduce the curing cycle to a reasonable length. For the latter reasons, it is generally preferred to heat the plastic composition of step (B) at temperatures varying from 100 to 450° F., more preferably 150 to 300° F. The condensation to a polymeric amido-carboxylate generally will be complete in from 5 to 10 minutes to as long as 1 hour at temperatures of from 100 to 300° F.

The polymeric condensation or "elasto-condensation" occurring in alternative step (D) of the process is a second stage reaction and is a result of carrying out the cure under more drastic conditions. When an elastic composition of step (C) is subjected to prolonged heating or to higher temperatures of 250 to 450° F. a definite change in the nature of the composition occurs. For example, the extremely high tensile strength and elongation of a step (C) composition is generally reduced along with a concomitant great improvement in stress-decay properties and compression set values. The second stage composition shows a characteristically greater response to carbon reinforcement than does the first stage composition. This second stage, believed to occur upon the formation of diamide (or imido) type linkage along with the splitting out of water, is brought about by heating a plastic uncured composition for from 1 to 4 hours or more at temperatures of 250 to 450° F., more preferably 300 to 400° F. Most preferably, it is preferred to utilize one of the elastic step (C) compositions which may be removed from the mold and heated for 1 to 100 hours or more at 300 to 375° F. to bring about the second stage reaction. Since one of the products of the second stage reaction of step (D) is water, the cure of thick cross sections is preferably effected in a mold under a pressure and at a temperature at which water will not be vaporized so that the interior thereof will not be pitted or spongy. For the latter reason, the cure of thick cross sections is preferably effected in a mold at temperatures of 300 to 400° F. under pressures of 500 to 30,000 lbs./sq. in. or more.

The invention will be more fully described with reference to the following specific examples demonstrating the preparation of various polymeric amido- and imido-carboxylates. The examples are intended to be illustrative only and not as limitations on the scope of the invention.

EXAMPLE 1

A rubbery interpolymer is prepared by the polymerization at 40° C. of a monomeric mixture consisting of 91.4 parts by weight of butadiene-1,3 and 8.6 parts by weight of methacrylic acid in a medium having the following composition:

| Material: | Parts/wt. |
|---|---|
| Monomers | 100.0 |
| Water | 200.0 |
| Dodecylamine (90% neutralized with HCl) | 5.0 |
| t-Dodecyl mercaptan | 0.4 |
| Potassium persulfate | 0.2 |
| Aluminum chloride | 0.2 |

The resultant polymer latex is shortstopped at 74% conversion with 0.2% by weight of hydroquinone and stabilized by 1.5% by weight of phenyl-beta-naphthylamine on the original 100 parts of monomers to yield a copolymer analyzing 0.116 e.p.h.r. of carboxyl. Hexamethylene diamine carbonate, 12.75 parts per 100 of rubber (p.h.r.), is incorporated by milling and the resultant composition heated for 1 hour at 356° F. to produce a strongly elastic composition having a tensile strength in excess of 3000 lbs./sq. in. The cured composition has a resistance to ozone many times greater than standard sulfur vulcanizate of the same polymer.

EXAMPLE 2

A tripolymer containing 0.0976 e.p.h.r. of carboxyl (—COOH) prepared by the polymerization in a dodecyl-amine hydrochloride emulsified recipe similar to that of Example 1 of a monomeric mixture consisting of 55% by weight of butadiene-1,3, 35% acrylonitrile and 10% methacrylic acid is compounded with 7.8 p.h.r. of hexamethylene diamine carbonate and 30 parts by weight of a carbon black known as "Philblack O." A number of separate samples of this composition are press molded for various times and at various temperatures to produce compositions having the following properties:

*Table 1*

| Cure Cycle, Minutes/ Temperature | 300% Modulus, lbs./sq.in. | Tensile, lbs./sq.in. | Elongation, Percent | Compression Set, Percent | Hardness Shore A | Time for 10% Stress, Loss-Hrs. |
|---|---|---|---|---|---|---|
| 60 x 176° F | 1,620 | 5,300 | 650 | 100 | 76 | 0.013. |
| 120 x 176° F | 1,600 | 4,880 | 675 | 100 | 78 | 0.013. |
| 240 x 176° F | 1,570 | 4,830 | 700 | 99 | 77 | 0.012. |
| 60 x 356° F | 2,170 | 4,460 | 475 | 14 | 85 | 1.5. |
| 120 x 356° F | 4,000 | 4,230 | 325 | 9 | 89 | 8% in 22 hrs. |
| 240 x 356° F | -------- | 5,690 | 275 | 8 | 91 | 9% in 23 hrs. |

The sample heated for 120 minutes at 176° F. has a remarkable resistance to ozone as shown by the fact that when it is exposed at 120° F. to a concentration of ozone of 29 parts per million when under 20% stretch no cracking appears in 143 hours. When similarly exposed, the sample cured for 120 minutes at 356° F. shows no cracking in 71 hours. Both of these samples are much superior in ozone resistance to a sulfur vulcanizate of the tripolymer or of a copolymer of 55 parts butadiene-1,3 and 45 parts acrylonitrile, the latter showing cracks after only about 23 hours exposure.

Inspection of Table 1 will reveal that the samples cured for 1 to 4 hours at 176° F. are first stage polymeric carboxylates showing the characteristic high tensile strength and elongation, low modulus, and poor compression set and stress-decay properties. The samples cured 1, 2 and 4 hours at 356° F. are second stage polymeric imido-carboxylates evidencing the characteristic high modulus, reduced elongation, greater hardness and sharply improved compression set and stress-decay properties.

When hexamethylene diamine carbonate is replaced with the borate or acetate, a well vulcanized product having good stress-strain properties is obtained.

EXAMPLE 3

A tripolymer is made by first preparing a soap solution containing 2 parts of sodium decyl benzene sulfonate and 1 part of the sodium salt of a polyalkylated naphthalene sulfonate known as "Daxad #11" in about 140 parts of water. To this soap solution in a reaction vessel there are added 0.1 part of sulfuric acid (to a pH of 4.0) and one-half of a mixture of monomers consisting of ethyl acrylate, acrylic acid and methacrylic acid in the proportions of 94 parts by weight of ethyl acrylate, 3 parts acrylic acid and 3 parts of methacrylic acid. A catalyst solution consisting of 0.20 parts/100 of monomers of potassium persulfate in water is prepared and added to the reaction vessel. The remainder of the monomers are added increment-wise for 10 hours. The reaction proceeds smoothly at a temperature of 50° C. to a yield of about 88% in 21 hours. The polymer latex is coagulated and the coagulum washed several times with 3% HCl solution and then with clear water until acid-free. The dried polymer contains 0.078 e.p.h.r. of carboxyl.

A tetrapolymer is prepared in a similar fashion from a monomeric mixture consisting of 88% by weight of ethyl acrylate, 5% acrylic acid, 5% methacrylic acid and 2% divinyl benzene. The solid tetrapolymer contains 0.122 e.p.h.r. of (—COOH) and has a Mooney viscosity (ML) after 4 minutes at 212° F. of 97.5. The tripolymer and tetrapolymer are mixed with various amounts of hexamethylene diamine carbonate (HMDAC) and, as a control Trimene Base, along with 40 parts by weight of carbon black. When various samples of these compositions are cured the following results are obtained:

| Polymer | Curing Agent, e.p.h.r. | Curing Cycle, min. 0° F. | 300% Modulus lbs./sq./in. | Tensile, lbs./sq./in. | Elongation, percent | Compression set | Hardness Shore A |
|---|---|---|---|---|---|---|---|
| (1) Tripolymer. | HMDAC—0.125<br>Stearic acid—3 p.h.r. | 60 x 310° F. | | 2,560 | 200 | 9.8 | 91 |
| (2) Tripolymer. | Trimene Base—3.0 p.h.r.[1]<br>Stearic acid—3.0<br>Sulfur—0.5<br>Black—40.0 | 30 x 260° F.<br>60 x 310° F. | 490 | 310<br>700 | 1,620<br>720 | 100.0<br>100.0 | 55<br>55 |
| (3) Tetrapolymer. | HMDAC—0.125 | 60 x 310° F. | | 2,470 | 100 | 17 | 96 |
| (4) Tetrapolymer. | Trimene Base—3 p.h.r.[1]<br>Sulfur—0.3"<br>Stearic acid—3.0<br>Black—40.0 | 60 x 310° F. | | 1,490 | 240 | 50 | 80 |

[1] Triethyl trimethylene triamine.

Samples 1 and 3 which are elasticized with a polyamine salt according to this invention, are seen to exhibit the excellent tensile strength, high modulus and hardness, and low compression set characteristic of the second-stage polymeric imido-carboxylates. When hexamethylene diamine is substituted for the carbonate in (1) difficulty is experienced during mill mixing. The stock becomes quite hot, dry and tough, is difficult to mold and the vulcanized product has a tensile strength of only 1590 p.s.i. at 60×310° F. cure. Samples 2 and 4, which illustrate an attempt to apply the conventional polyacrylate Trimene Base-sulfur cure to carboxyl-containing polymers, will be seen to be vastly inferior. These comparisions clearly show that the elasticization method of this invention results in a different mechanism of cure than is obtained in the Trimene Base cure. The carbonate is much more readily incorporated into the polymer on a mill than the Trimene Base or hexamethylene diamine and the former shows no tendency to scorch while the latter two do so. When hexamethylene diamine borate is substituted for the carbonate in (1) above, a vulcanized product having a tensile strength of about 2000 p.s.i. is obtained.

EXAMPLE 4

Still another rubbery carboxyl-containing material which is efficiently converted to strongly elastic polymeric carboxylates and polymeric imido-carboxylates by the method of this invention is a rubbery copolymer of isobutylene and acrylyl chloride prepared by polymerization in ethyl chloride in the presence of a Friedel-Crafts aluminum chloride catalyst, and which has been hydrolyzed to convert the acid chloride groups to carboxyl (—COOH) groups. A copolymer made in this fashion at —100° C. or lower from 1.0 mole of isobutylene and 0.2 mole of acrylyl chloride is found to contain about 0.06 e.p.h.r. of carboxyl and to have a molecular weight in excess of 250,000. When 5.0 p.h.r. of hexamethylene diamine carbonate and 40 p.h.r. of carbon black are incorporated in the hydrolyzed copolymer and the resultant plastic composition heated for 90 minutes at 350° F. a strongly elastic material is obtained.

While I have disclosed certain manners of performing my invention, I do not thereby desire or intend to limit myself solely thereto, for the precise proportions of the materials utilized may be varied and equivalent materials may be employed, if desired, without departing from the spirit and scope of the invention as defined in the appended claims.

This application is a continuation-in-part of my co-pending application Serial No. 238,579, filed July 23, 1951, now abandoned.

I claim:

1. The process which comprises preparing a mixture of (A) a carboxyl-containing polymer selected from the class consisting of (1) interpolymers of (a) a butadiene-1,3 hydrocarbon with (b) at least one olefinically unsaturated carboxylic acid selected from the class consisting of acrylic and methacrylic acids, said interpolymers containing at least 50% by weight of polymerized (a) and an amount of (b) such that said interpolymers possess 0.001 to 0.30 chemical equivalents by weight of carboxyl (—COOH) groups in the interpolymer structure for each 100 parts by weight of interpolymer and (2) interpolymers of ethyl acrylate with (b) as set forth above, the amount of (b) being such that said interpolymers possess 0.001 to 0.30 chemical equivalents by weight of carboxyl (—COOH) groups in the interpolymer structure for each 100 parts by weight of interpolymer; with (B) an amine salt selected from the class consisting of carbonates, borates, acetates and stearates of alkylene polyamines of the structures $H_2N—R—NH_2$ wherein R represents an alkylene group of 2 to 6 carbon atoms, the amount of (B), expressed in chemical equivalents by weight, being $\frac{1}{10}$ to 2 times the chemical equivalents by weight of carboxyl groups in (A), and then heating the mixture of (A) and (B) at a temperature of about 100° F. to 450° F., thereby to cure the said carboxyl-containing polymer with said amine salt through reaction at the carboxyl groups of said carboxyl-containing polymer.

2. The process of claim 1 wherein (A) is an interpolymer of butadiene-1,3 and acrylic acid.

3. The process of claim 1 wherein (A) is an interpolymer of butadiene-1,3 and methacrylic acid.

4. The process of claim 1 wherein (A) is an interpolymer of butadiene-1,3, acrylonitrile and methacrylic acid.

5. The process of claim 1 wherein (A) is an interpolymer of ethyl acrylate, acrylic acid and methacrylic acid.

6. The process of claim 1 wherein (B) is hexamethylene diamine carbonate.

7. An elastic polymeric composition produced by the proces of claim 1.

References Cited in the file of this patent

UNITED STATES PATENTS

| | | |
|---|---|---|
| 2,395,505 | Sarbach | Feb. 26, 1946 |
| 2,669,550 | Brown | Feb. 16, 1954 |
| 2,772,251 | Hansen et al. | Nov. 27, 1956 |
| 2,880,189 | Miller et al. | Mar. 31, 1959 |
| 2,888,442 | Uraneck et al. | May 26, 1959 |